United States Patent [19]

Brainard

[11] Patent Number: 5,439,256

[45] Date of Patent: Aug. 8, 1995

[54] BULKHEAD FITTING FOR THIN FLEXIBLE BARRIERS

[76] Inventor: Paul M. Brainard, 5561 Santa Anita Ave., #5, Temple City, Calif. 91780

[21] Appl. No.: 320,117

[22] Filed: Oct. 7, 1994

Related U.S. Application Data

[63] Continuation-in-part of Ser. No. 142,868, Oct. 25, 1993, abandoned.

[51] Int. Cl.⁶ .............................................. F16L 41/08
[52] U.S. Cl. ..................................... 285/200; 114/361; 285/204; 285/158; 285/161
[58] Field of Search ................ 114/361; 285/161, 158, 285/200, 204, 205, 206, 212

[56] References Cited

U.S. PATENT DOCUMENTS

| | | | |
|---|---|---|---|
| 499,956 | 6/1893 | Berry | 285/200 |
| 795,564 | 7/1905 | Turner | 285/200 |
| 1,274,988 | 8/1918 | Chadwick | 285/205 |
| 1,637,365 | 8/1927 | Wernle | . |
| 2,137,223 | 11/1938 | Baxter | 285/38 |
| 2,202,049 | 5/1940 | Fitzgerald | 285/200 |
| 2,266,611 | 12/1941 | Martin et al. | 285/205 |
| 2,394,609 | 2/1946 | Hardesty | 285/205 |
| 2,500,531 | 3/1950 | Eger | 152/429 |
| 2,747,896 | 5/1956 | Quillinan | 285/38 |
| 3,042,056 | 7/1962 | Todorovic | 135/33 |
| 3,190,332 | 6/1965 | Bernard | 285/204 |
| 3,327,724 | 6/1967 | Nielsen | 135/5 |
| 3,423,518 | 1/1969 | Weagant | 285/161 |
| 3,475,772 | 11/1969 | Lokken | 114/361 |
| 3,531,142 | 9/1970 | Peasley | 285/39 |
| 3,650,551 | 3/1972 | Akers | 285/158 |
| 3,986,733 | 10/1976 | Esser | 285/158 |
| 4,018,459 | 4/1977 | Mominee et al. | 285/200 |
| 4,623,171 | 11/1986 | Wilson | 285/42 |
| 4,730,854 | 3/1988 | Cuschera | 285/42 |
| 4,852,916 | 8/1989 | Johnson | 285/200 |
| 5,143,014 | 9/1992 | Gabison | 114/361 |
| 5,341,760 | 8/1994 | Summers | 114/361 |

FOREIGN PATENT DOCUMENTS

| | | | |
|---|---|---|---|
| 113819 | 9/1941 | Australia | 285/200 |
| 122838 | 11/1946 | Australia | 285/200 |
| 47806 | 5/1911 | Austria | 285/200 |
| 594881 | 3/1934 | Germany | 285/200 |
| 731170 | 6/1955 | United Kingdom | 285/200 |

OTHER PUBLICATIONS

Industrial Options, Inc., Versi-Tarp, Sales flyer.
Industrial Options, Inc., Salvage Tarp, Sales flyer.

Primary Examiner—Eric K. Nicholson
Attorney, Agent, or Firm—R. Joseph Trojan; Trojan Law Offices

[57] ABSTRACT

A bulkhead fitting for draining fluids off the topside of a thin flexible barrier cover (31), comprising: a male threaded member (1), a female threaded member (11), and an o-ring seal (21). The male threaded member (1) has a male threaded spout (4), and a wide flange (2) that extends outward from the top end of the male threaded spout (4). The wide flange (2) rests on the topside of the barrier (31) and the male threaded spout (4) extends through an opening made in the barrier (31). The wide flange (2) distributes the weight of the fitting over the surface of the barrier (31), so that the barrier (31) can support the fitting. The female threaded member (11) has a female threaded spout (15), and a seal supporting flange (12) extending outward from the top end of the female threaded spout (15). The female threaded spout (15) threads onto the male threaded spout (4) from the underside of the barrier (31). The seal supporting flange (12) holds the o-ring seal (21) and presses it against the underside of the barrier (31). The barrier (31) is clamped between the wide flange (2) and the o-ring seal (21). On the outersurface of the lower half of the female threaded spout (15), there is an arrangement of tube grabbing barbs (16). Flexible tubing (32) is stretched over the lower half of the female threaded spout (15) and barbs (16). The tubing (32) is held in place by the barbs (16). With the fitting installed onto the barrier (31), fluids flow off the barrier (31) into the fitting, and are directed to a desired location by the tubing (32).

5 Claims, 3 Drawing Sheets

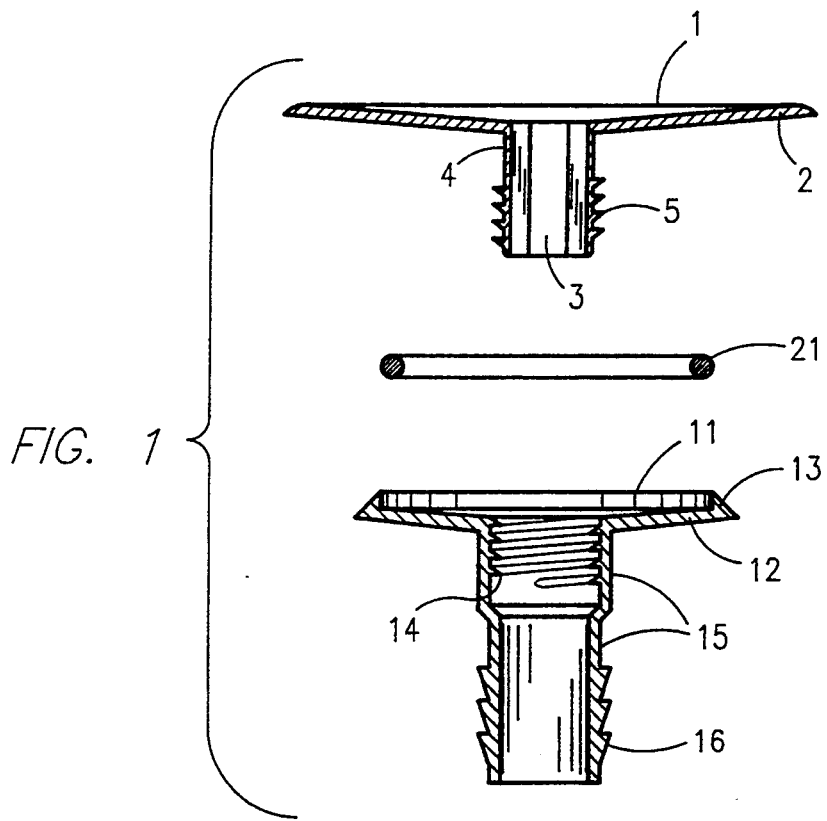
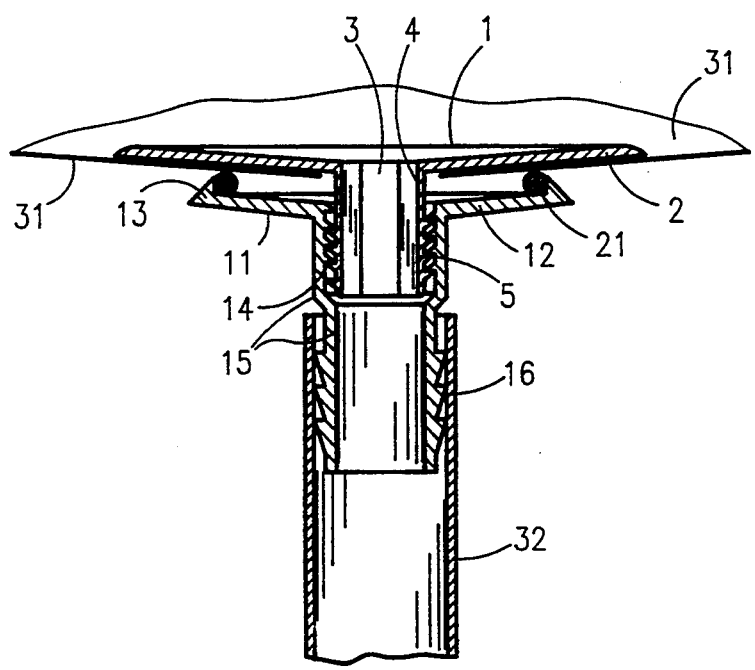

BULKHEAD FITTING FOR THIN FLEXIBLE BARRIERS

This is a continuation of application Ser. No. 08/142,868, Filed 1993 Oct. 25, now abandoned.

BACKGROUND OF THE INVENTION

1. Field of Invention

This invention relates in general to fluid fittings, in particular to fluid fittings which are used for attaching conduits to flexible barriers.

2. Description of Prior Art

Many outdoor swap meet vendors make temporary shelters that consist of a cube like framing with thin plastic sheeting or canvas laid horizontally across the top of the frame. The plastic sheeting or canvas acts as a barrier to protect the interior of the shelter from environmental elements. The shelters are usually at least 8 feet wide and 8 feet deep, making the area of the barrier cover at least 64 square feet. 1 mil or 3 mil thick plastic sheeting, or canvas is frequently used as a barrier for these shelters. The plastic sheeting or canvas barrier tends to sag between the frame supports. This sagging creates a depression, so that when it rains, the rain collects on the top of the barrier. The weight of the collected rain may damage and tear the barrier or cause the barrier to collapse. If the barrier is not damaged by the weight of the collected rain, the vendor must somehow drain the collected rain off the barrier before taking the shelter down at the end of the day. This creates some difficulty for these swap meet vendors during rainy weather.

Some swap meet vendors place a pole in the center of the shelter, that raises the center of the barrier, to prevent a depression from forming in the center. This allows rain to drain off the barrier to the sides of the shelter. Unless the barrier is kept taunt there will still be some sagging between the center pole and the sides of the shelter, which will allow rain to collect on top of the barrier. Having rain run off of the sides of the shelter could cause some other problems for the vendors, such as unwanted splashing into the shelter.

A typical bulkhead fitting installed into a hole made in the center of the barrier would create a passage for the collected rain to pass through the barrier. A conduit attached to the bulkhead fitting could direct the rain from the fitting to a container or a drainage area. To adequately drain a surface area of 64 square feet or more the opening in the fitting and the inside diameter of the conduit would need to be at least 0.5 inches in diameter. The conduit would need to be several feet in length to adequately remove the rain away from the shelter. The combined weight of a fitting of adequate size, and a 12 foot conduit with a 0.5 inch inside diameter, plus the weight of the water that flows through the conduit would be at least 2.5 lbs if the fitting and conduit were made of lightweight materials such as plastic. With the fitting attached to the barrier, the barrier would need to support the combined weight of the fitting, conduit, and water flowing through the conduit. Typical bulkhead fittings are designed to be attached to relatively strong and rigid materials such as metal or plastic plates, and are made with narrow flanges for clamping onto the barrier. The flanges usually extend outward perpendicular to the axis of the fitting. Because the flanges are narrow, the combined weight of a typical bulkhead fitting, attached conduit, and water flowing through the conduit would not be readily supported by a thin plastic sheeting or canvas barrier, without the likelihood of tearing or damaging the barrier.

Several types of fittings exist for attaching a conduit to flexible barriers. For example U.S. Pat. Nos. 2,137,223 to Baxter (1938), 2,500,531 to Eger (1950), and 2,747,896 to Quillinan (1956). These prior art fittings have narrow flanges for clamping onto the barrier, and thus will only work effectively with barriers of sufficient thickness to support the fitting. These fittings would not be adequately supported by thin plastic sheeting, canvas, or membrane like material. These fittings rely on the barrier itself to act as a seal, which would only be effective if the barrier is of sufficient thickness and compressibility to act like a seal. These prior art fittings would not seal effectively if installed on a barrier made of thin flexible material such as thin plastic sheeting or canvas.

Typical bulkhead fittings cannot be tightened during installation from one side of the barrier that the fitting is being installed on. The male threaded member of the fitting, that abuts itself on the one side of the barrier, must be prevented from rotating while the female threaded member of the fitting, that abuts itself on the other side of the barrier, is threaded onto the male threaded member. Installing a typical bulkhead fitting onto a large sheet barrier would require two persons, one person to grasp the male threaded member of the fitting to prevent rotation while the other person threads the female threaded member onto the male threaded member.

There are a special class of fittings for attaching a conduit to a barrier that can be installed from one side of the barrier. For example, in U.S. Pat. Nos. 1,637,365 to Wernle (1927), 3,650,551 to Akers (1972), and 4,623,171 to Wilson (1986). Two of these fittings are designed with narrow flanges so that the flanges are able to pass through the opening in the barrier. A narrow flange abutting on the top side of a thin plastic sheeting or canvas barrier, would not distribute the weight of the fitting over an area of the barrier adequate to support the fitting, and the barrier would likely be damaged by the weight of the fitting. One of the fittings is designed with thin metal strips that pass through the opening in the barrier and then expand and abut against the barrier to support the fitting. These thin metal strips would not adequately distribute the weight of the fitting if used with a thin plastic sheeting or canvas barrier, and the weight of the fitting would likely cause damage to the barrier.

Typical roof and floor drains are designed to be installed in structures made of wood, concrete, or steel. For example U.S. Pat. Nos. 3,986,733 to Esser (1976) and 4,730,854 to Cuschera (1988). These drains are too heavy to be supported by an opening in a thin plastic sheeting or canvas barrier.

There is a canvas cover system that has a water catch feature manufactured into the cover, near the edge of the cover. U.S. Pat. No. 3,327,724 to Nielsen (1967). This water catch feature allows rain to drain off of the cover. This water catch feature would be difficult to install on a thin plastic sheeting or canvas barrier already in use as a cover. This water catch feature would work only on a barrier that slants toward the edge of the shelter, and would not work where a barrier slopes toward the center of the shelter, because the catch would let the rain drain into the interior of the shelter. It would be difficult to attach a conduit to this water catch feature, to direct the runoff to a container or drainage area.

There is a canvas umbrella with rain troughs manufactured on the edges. U.S. Pat. No. 3,042,056 to Todorovic (1962). This trough feature would be difficult to install on a thin plastic sheet or canvas barrier already in use as a cover. The trough system would only work where a barrier slants toward the edges of the shelter, and would not work where a barrier slopes toward the center of the shelter.

There is a heavy duty, fiber reinforced tarp, manufactured with a fluid fitting in the center. The fitting is designed so that a garden hose can be attached to the fitting, so that fluids can drain off the topside of the tarp into the fitting and then be directed into the hose. This tarp is sold by a company called Industrial Options, located in Huntington, N.Y. The fitting itself is comprised of a male threaded spout, and a female threaded locknut. The male threaded spout has a flange extending outward from the top end of the spout at an angle perpendicular to the spout. The female threaded locknut has a flange extending outward from one end of the locknut at an angle perpendicular to the side of the locknut. The fitting is assembled onto an opening in the tarp with the tarp clamped between the flange of the male threaded spout and the flange of the female threaded locknut. There is a cement between the two flanges that bonds the fitting to the tarp and prevents the fitting from being removed from the tarp. The cement also acts as a seal between the fitting and the tarp. No evidence of an existing patent for this tarp or fitting has been found.

One problem with this invention is the use of cement to seal the fitting to the tarp. Once the cement dries, the fitting cannot be easily removed from the tarp without damaging the tarp and fitting, thereby not allowing the fitting to be reused again on a different tarp.

Another problem with this invention is that the flange of the male threaded spout has a surface area, which rests against the barrier, that is less than 8 times larger than the area of the cross section of the male threaded spout. If this fitting was used with a thin, non-reinforced barrier, such as 1 mil thick polysheeting, this flange would not distribute the combined weight of the fitting, conduit, and water flowing through the conduit, over a large enough area of the barrier to allow the barrier to support the combined weight of the fitting, conduit, and water flowing through the conduit, and the barrier would likely be damaged.

Another problem with this invention is that the flange of the male threaded spout extends outwardly at an angle that is perpendicular to the male threaded spout. When a tarp is suspended from it's edges, the tarp slopes downward towards its center. This flange does not conform to the sloped surface of the tarp. If this fitting was used with a thin, non-reinforced barrier, such as 1 mil thick polysheeting, the flange would not evenly distribute the combined weight of the fitting, conduit, and the water flowing through the conduit, over the sloped surface of the tarp that is in contact with the flange, and would cause excessive stress on the barrier and would likely damage the barrier.

OBJECTS & ADVANTAGES

The objects and advantages of the present invention are:

(a) to provide a bulkhead fitting to be used with a thin flexible barrier, that would allow fluids to pass through the barrier and be directed into a conduit;

(b) to provide a bulkhead fitting to be used with a thin flexible barrier, such as 1 mil thick plastic sheeting, 3 mil plastic sheeting, or canvas, that would provide a means of allowing the barrier to support the weight of the fitting, plus the weight of an attached conduit, plus the weight of fluid flowing through the fitting and conduit, without compromising the structural integrity of the barrier;

(c) to provide a bulkhead fitting that would provide a fluid tight seal with a thin flexible barrier, with a minimal amount of pressure being exerted against the barrier by the seal member of the fitting;

(d) to provide a bulkhead fitting that can be easily installed onto a thin flexible barrier by a single person, even if the barrier on which the fitting is being installed is very large;

(e) to provide a bulkhead fitting to be used with a thin flexible barrier that could be easily removed from the barrier, and reused multiple times with other barriers.

Still further objects and advantages will become apparent from a consideration of the drawings and ensuing description.

DRAWING FIGURES

FIG. 1 shows an exploded, sectional view of the components of the bulkhead fitting of the present invention.

FIG. 2 shows a sectional view of the present invention as installed on a thin flexible barrier, and with flexible vinyl tubing attached.

Figure 3:
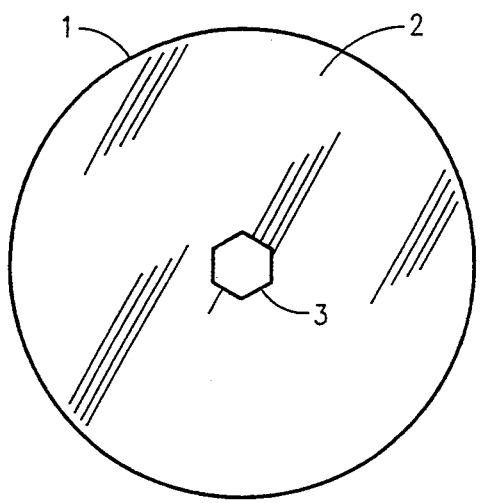
FIG. 3 shows a top view of the male threaded member of the bulkhead fitting of the present invention.

REFERENCE NUMERALS IN DRAWINGS 1 male threaded member
2 wide flange
3 hexagonal bore
4 male threaded spout
5 male thread
11 female threaded member
12 seal supporting flange
13 concentric seal retainer cusp
14 female thread
15 female threaded spout
16 arrangement of three barbs
17 smooth outer surface 18 elbow like bend
19 female threaded aperture
21 o-ring seal
22 rubber like washer
31 thin flexible barrier
32 flexible vinyl tubing

SUMMARY

A fluid fitting for attaching a conduit to an opening in a thin flexible barrier, to allow fluids to drain through the barrier and then be directed into the conduit.

DESCRIPTION OF THE PREFERRED EMBODIMENT—FIGS. 1 to 7

Figure 4:
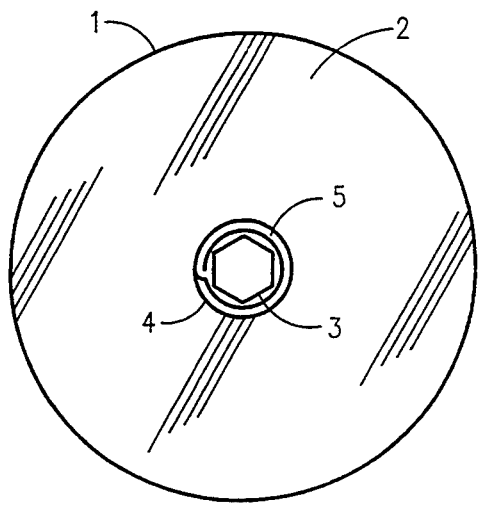
FIG. 4 shows a bottom view of the male threaded member of the bulkhead fitting of the present invention.
Figure 5:
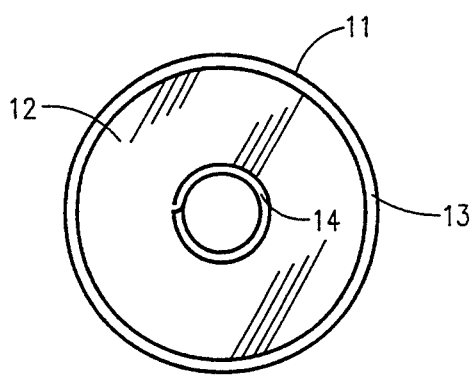
FIG. 5 shows a top view of the female threaded member of the bulkhead fitting of the present invention.
Figure 6:
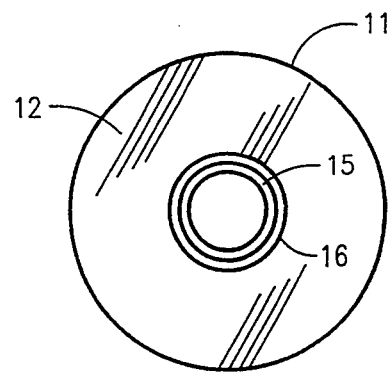
FIG. 6 shows a bottom view of the female threaded member of the bulkhead fitting of the present invention.
Figure 7:
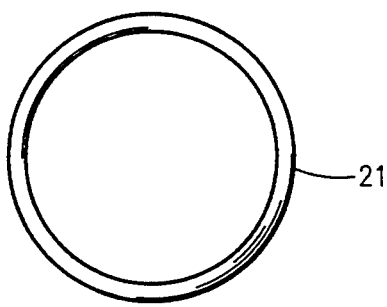
FIG. 7 shows a top view of the o-ring seal member of the bulkhead fitting of the present invention.
Figure 8:
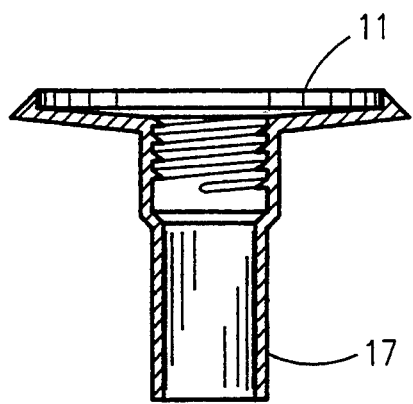
FIG. 8 shows a sectional view of a female threaded member with a smooth outer surface on the female threaded spout.
Figure 9:
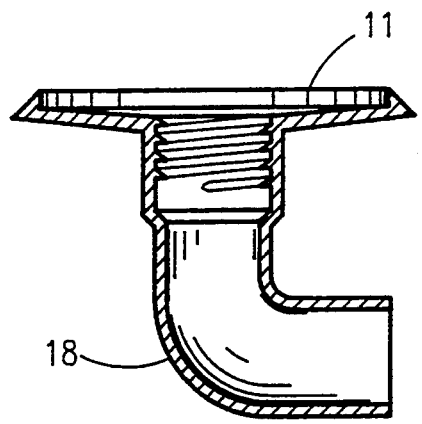
FIG. 9 shows a sectional view of a female threaded member with an elbow like bend in the female threaded spout.
Figure 10:
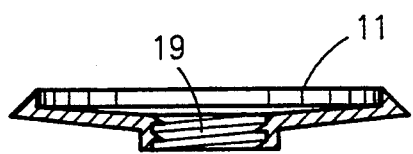
FIG. 10 shows a sectional view of a female threaded member without a means for attaching a conduit.
Figure 11:
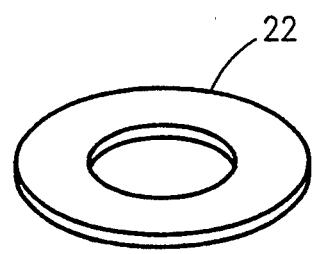
FIG. 11 shows a perspective view of a flexible seal that is shaped like a washer.

A typical embodiment of the fitting is shown in FIGS. 1 to 7. FIG. 1 shows the three members in a sectional exploded view: a male threaded member 1, a female threaded member 11, and an o-ring seal 21. FIG. 3 shows a top view of the male threaded member 1. FIG. 4 shows a bottom view of the male threaded member 1. FIG. 5 shows a top view of the female threaded member 11. FIG. 6 shows a bottom view of the female threaded member 11. FIG. 7 shows a top view of the o-ring seal 21.

FIG. 2 shows the fitting as installed onto a thin flexible barrier cover 31. The barrier cover 31 consists of a material such as thin plastic sheeting that is either 1 mil or 3 mil thick, or canvas. A typical situation would have the barrier 31 suspended within four horizontal rails that form a rectangle or square and are part of a temporary shelter, like the shelters used by many swap meet vendors. Gravity causes the barrier cover 31 to slope downward towards the center between the supporting rails. The size of the barrier 31 would likely be at least 64 square feet.

The male threaded member 1 has a male threaded spout 4 and a wide flange 2 that extends outward from the top of the male threaded spout 4. The wide flange 2 is circular in shape and has a slight slope towards the center of the flange 2. The slope of the flange 2 allows the flange 2 to better conform to the slope of the barrier 31, to evenly distribute the weight of the fitting, plus the weight of the vinyl tubing 32, plus the weight of the water flowing through the vinyl tubing 32 over the surface of the barrier 31. The slope of the flange 2 should be at least 95° as measured from the side of the male threaded spout 4, and no greater than 110° as measured from the side of the male threaded spout 4. If the slope of the flange 2 is less than 95° as measured from the side of the male threaded spout 4, then the distribution of the combined weight of the fitting, tubing 32, and water flowing through the tubing 32, onto the barrier 31 by the flange 2, would be concentrated near the outer edge of the flange 2, and the barrier 31 would likely be over stressed and damaged in that area that comes into contact with the flange 2 near the outer edge of the flange 2. If the slope of the flange 2 is greater than 110° as measured from the side of the male threaded spout 4, then the distribution of the combined weight of the fitting, tubing 32, and water flowing through the tubing 32, onto the barrier 31 by the flange 2, would be concentrated near the center of the flange 2, and the barrier 31 would likely be over stressed and damaged in that area that comes into contact with the flange 2 near the center of the flange 2. The wide flange 2 has a large surface area that rests against the barrier 31. The wide flange 2 is made with a surface area that is at least 12 times larger than the area of the cross section of the male threaded spout 4 so that it will distribute the combined weight of the fitting, tubing 32, and water flowing through the tubing 32, over an adequately large enough surface area of the barrier 31 to allow the barrier 31 to adequately support the combined weight of the fitting, tubing 32, and water flowing through the tubing 32. If the wide flange 2 is made with a surface area that is less than 12 times larger than the area of the cross section of the male threaded spout 4, then the combined weight of the fitting, tubing 32, and water flowing through the tubing 32, will not be distributed over a large enough surface area of the barrier 31 that will allow the barrier 31 to adequately support the combined weight of the fitting, tubing 32, and water flowing through the tubing 32, without a high risk of damaging the barrier 31. The reason the size of the surface area of the wide flange 2 is dependent on the size of the male threaded spout 4 is because the size of the male threaded spout 4 determines the size of the opening in the barrier 31, the diameter and weight of the tubing 32 attached to the male threaded spout 4, and the volume and weight of the water flowing through the tubing 32. The larger the male threaded spout 4, the greater the combined weight of the tubing 32 and water flowing through the tubing 32, and therefore the larger the necessary surface area of the flange 2 that rests against the barrier 31 to distribute the weight of the fitting, tubing 32, and water flowing through the tubing 32 onto the barrier 31. The male threaded spout 4 is generally cylindrical in shape, has a bore 3 though its length for fluids to pass through, and a male thread 5 on its outer surface for joining it to the female threaded member 11. The bore 3 through the male threaded spout 4 is hexagonal in shape so that an allen wrench can be inserted into it to help in the installation of the fitting onto the barrier 31.

The female threaded member 11 has a female threaded spout 15 and a seal supporting flange 12 that extends outward from the top of the female threaded spout 15. The seal supporting flange 12 has a concentric cusp 13 near the edge of the flange 12 for holding the o-ring 21 in place. The female threaded spout 15 has a female thread 14 on its inner surface to receive the male threaded spout 4, and an arrangement of 3 barbs 16 encircling the outer surface of the lower half of the spout 15. The barbs are used for attaching flexible vinyl tubing 32 to the spout 15.

The male threaded member 1 and the female threaded member 11 are made of injected molded plastic. This provides for a light weight construction which is important since the weight of the fitting is to be supported by a thin flexible barrier 31.

The o-ring seal 21 is made of an inert, rubbery material such as nitrile or urethane. The thickness of the o-ring seal 21 is slightly less than twice the height of the concentric seal retainer cusp 13. The outside diameter of the o-ring seal 21 is slightly smaller than the inside diameter of the concentric seal retainer cusp 13. Using a soft, rubbery material for the o-ring seal 21, allows a fluid tight seal to be made between the fitting and the barrier 31, with only a minimal amount of pressure exerted against the barrier by the o-ring seal 21, thereby minimizing the chance of damage being caused to the thin barrier 31 by the clamping action of the fitting onto the barrier 31. Using the o-ring 21 instead of a cement to seal the fitting with the barrier 31, allows the fitting to be easily removed from the barrier 31 and reused multiple times with other barriers.

As FIG. 2 shows, the wide flange 2 of the male threaded member 1 is resting on top of the barrier cover 31, with the male threaded spout 4 projecting through an opening in the center of the barrier 31. The wide flange 2 has a slight slope of a few degrees towards the center of the fitting, to conform to the slope of the barrier cover 31.

The female threaded member 11, has been threaded onto the male threaded member 1. The o-ring 21 is resting on top of the seal supporting flange 12 and is pressed against the underside of the barrier 31 by the seal supporting flange 12. The barrier 31 is clamped between the wide flange 2 and the o-ring seal 21, creating a fluid tight seal between the fitting and the barrier 31. A length of flexible vinyl tubing 32 that has an inner diameter slightly less than the major diameter of the barbs 16, has been stretched over the lower half of the female threaded spout 15 and barbs 16. The tubing 32 is of sufficient length to guide fluids from the fitting to a desired location.

The tubing 32 is made of soft flexible vinyl. The tubing 32 is elastic enough to securely hold onto the barbs 16, and soft enough to create a fluid tight seal with the barbs 16.

OPERATION OF INVENTION—FIG. 2

Referring to FIG. 2, to install the fitting of the present invention onto a thin flexible barrier cover 31, the first step is to cut a hole in the center, or the lowest point, of the barrier cover 31. The diameter of the hole is to be made slightly larger than the major diameter of the male thread 5.

The next step is to set the male threaded member 1 on the topside of the barrier cover 31, with the wide flange 2 resting on the topside of the barrier cover 31 and the male threaded spout 4 extending through the hole that was cut into the barrier cover 31 in the previous step.

The next step is to place the o-ring seal 21 within the seal retainer cusp 13 of the seal supporting flange 12. From the underside of the barrier, the female threaded spout 15 is threaded onto the male threaded spout 4 with the seal supporting flange 12 in an upward position. To begin to thread the female threaded spout 15 onto the male threaded spout 4, one would grasp the male threaded spout 4 at the top near the wide flange 2 with one hand, and thread the female threaded spout 15 onto the male threaded spout 4 with the other hand. Once the male threaded spout 4 and the female threaded spout 15 have been loosely joined, one can let go of the fitting which is now supported by the cover 31.

An allen wrench of the same size as the hexagonal bore 3 of the male threaded spout 4, is then inserted into the lower end of the female threaded spout 15, through the length of the female threaded spout 15, and into the male threaded spout 4 until the allen wrench engages the hexagonal bore 3 of the male threaded spout 4. The allen wrench is held firmly in one hand to prevent the male threaded member 1 from rotating while the female threaded spout 15 is further threaded onto the male threaded spout 4. The female threaded member 11 is grasped with the other hand and further threaded onto the male threaded spout 4 by rotating the female threaded member 11. The female threaded member 11 is rotated until the barrier 31 is clamped firmly between the wide flange 2 and the o-ring seal 21, and a fluid tight seal is made between the fitting and the barrier 31.

The next step is to slide the allen wrench out of the fitting. Flexible vinyl tubing 32 is then attached to the lower half of the female threaded spout 15 by sliding the tubing 32 over the lower half of the spout 15 and barbs 16 until the tubing 32 fully covers the lower half of the female threaded spout 15. The tubing 32 would be of sufficient length to direct fluids from the fitting to any desired location for collection or disposal. The installation is now complete.

With the fitting shown in FIG. 2 installed onto the barrier cover 31, and with the tubing 32 attached to the fitting, as rain falls onto the barrier cover 31, the rain will drain towards and into the fitting which will guide the rain into the tubing 32. The tubing 32 will then direct the rain to a drainage area or container, as desired by the user of this fitting.

SUMMARY, RAMIFICATIONS, AND SCOPE

Accordingly, the reader will see that the bulkhead fitting of this invention can be used effectively with thin flexible barriers, such as a thin plastic sheeting cover, to drain fluids through the barrier and direct the fluids to a conduit. In addition, The wide and tapered flange of the fitting would allow a thin flexible barrier, such as 1 mil thick plastic sheeting, to support the combined weight of the fitting, conduit, and water flowing through the conduit, without compromising the structural integrity of the barrier, the fitting will provide a gentle fluid tight seal with a thin flexible barrier, the fitting can be readily installed by a single person even if the barrier is very large, and the fitting can be reused multiple times with different barriers.

Although the description above contains many specifications, these should not be construed as limiting the scope of the invention but as merely providing an illustration of the presently preferred embodiment of this invention.

For example, the male threaded member and the female threaded member could be made of a material other than plastic, such as brass, depending on the specific needs of the application. The wide flange can be made without a taper and instead be made of a flexible material that will flex and bend to conform to the slope of the barrier, so that the flange will evenly distribute the combined weight of the fitting, conduit, and the water flowing through the conduit onto the barrier. The bore of the male threaded spout could have other shapes for engaging different shaped wrenches or tools. For example, the bore could be square, semicircular, etc.

The lower half of the female threaded spout could have a different means of attaching a conduit other than the barbs, such as a compression hose attachment fitting, or a smooth outer surface so that a hose clamp could be used in conjunction with the spout to attach a hose to the fitting. The female threaded spout could be made with a 90° elbow like bend between the seal supporting flange and conduit attaching means.

The female threaded member could be made without a conduit attaching means, and with a female threaded opening instead of a female threaded spout, so that the lower end of the male threaded spout will extend through the female threaded opening when the female threaded member and the male threaded member are threaded together. With the lower end of the male threaded spout exposed, a conduit could be attached to the lower end of the male threaded spout.

A rubber washer could be used instead of the o-ring seal. The seal supporting flange could have a different means for holding the seal in place, such as an adhesive compound instead of the concentric seal retainer cusp.

The fitting could be made in various sizes depending on the size of the area that needs to be drained, or depending on the volume of fluid that needs to be drained.

Thus the scope of the invention should be determined by the appended claims and their legal equivalence, rather than by the examples given.

I claim:

1. A fitting for attaching a conduit to an opening in a thin flexible barrier, comprising:
   (a) a male threaded member, a female threaded member, and a flexible seal,
   (b) said male threaded member having a male threaded spout and a wide flange, said male threaded spout having an upper end, said wide flange projects outwardly from said upper end at an angle slightly larger than 90° as measured from the side of said male threaded spout, said male threaded spout having a bore through the center of its length,
   (c) said thin flexible barrier being a sheet of flexible, water resistant material that is at least 1 mil thick, said thin flexible barrier having an upperside, said opening in the barrier being slightly larger than the outer perimeter of said male threaded spout, said wide flange having an undersurface, said undersurface to rest on said upperside of the barrier with said male threaded spout extending through said opening in the barrier, said undersurface having a surface area that is at least 12 times larger than the area of the largest cross section of said male threaded spout as measured perpendicular to the axis of said male threaded spout,
   (d) said female threaded member having a seal supporting flange with a female threaded aperture located approximately in the center of said seal supporting flange, said female threaded aperture receives said male threaded spout, said seal supporting flange having an uppersurface, said uppersurface faces towards said wide flange when said male threaded member and said female threaded member are threaded together,
   (e) said flexible seal having an inner perimeter that is smaller than both the outer perimeter of said wide flange and the outer perimeter of said seal supporting flange, said flexible seal rests on said uppersurface of said seal supporting flange, said flexible seal encircles said male threaded spout when said male threaded member and said female threaded member are threaded together,
   (f) a concentric cusp on said uppersurface of said seal supporting flange to hold said flexible seal in a fixed position.

2. A fitting for attaching a conduit to an opening in a thin flexible barrier, comprising:
   (a) a male threaded member, a female threaded member, and a flexible seal,
   (b) said male threaded member having a male threaded spout and a wide flange, said male threaded spout having an upper end, said wide flange projects outwardly from said upper end at an angle slightly larger than 90° as measured from the side of said male threaded spout, said male threaded spout having a bore through the center of its length,
   (c) said thin flexible barrier being a sheet of flexible, water resistant material that is at least 1 mil thick, said thin flexible barrier having an upperside, said opening in the barrier being slightly larger than the outer perimeter of said male threaded spout, said wide flange having an undersurface, said undersurface to rest on said upperside of the barrier with said male threaded spout extending through said opening in the barrier, said undersurface having a surface area that is at least 12 times larger than the area of the largest cross section of said male threaded spout as measured perpendicular to the axis of said male threaded spout,
   (d) said female threaded member having a seal supporting flange with a female threaded aperture located approximately in the center of said seal supporting flange, said female threaded aperture receives said male threaded spout, said seal supporting flange having an uppersurface, said uppersurface faces towards said wide flange when said male threaded member and said female threaded member are threaded together,
   (e) said flexible seal having an inner perimeter that is smaller than both the outer perimeter of said wide flange and the outer perimeter of said seal supporting flange, said flexible seal rests on said uppersurface of said seal supporting flange, said flexible seal encircles said male threaded spout when said male threaded member and said female threaded member are threaded together,
   (f) a spout, located underneath said seal supporting flange, extending downward from said seal supporting flange.

3. The fitting of claim 2 wherein said spout has a smooth outer surface.

4. The fitting of claim 2 further including a barb on the outer surface of said spout.

5. The fitting of claim 2 wherein said spout is shaped with an elbow like bend.

* * * * *